US012565005B2

(12) United States Patent
Ohno et al.

(10) Patent No.:    US 12,565,005 B2
(45) Date of Patent:         Mar. 3, 2026

(54) THREE-DIMENSIONAL MODELED OBJECT AND METHOD FOR MANUFACTURING THREE-DIMENSIONAL MODELED OBJECT

(71) Applicant: TOYOTA JIDOSHA KABUSHIKI KAISHA, Aichi-ken (JP)

(72) Inventors: Tomohiro Ohno, Seto (JP); Yumemi Ohkubo, Okazaki (JP); Hiroto Maruyama, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 788 days.

(21) Appl. No.: 17/960,083

(22) Filed: Oct. 4, 2022

(65) Prior Publication Data

US 2023/0121424 A1     Apr. 20, 2023

(30) Foreign Application Priority Data

Oct. 15, 2021     (JP) ................................. 2021-169243

(51) Int. Cl.
| | |
|---|---|
| *B29C 64/386* | (2017.01) |
| *B22F 10/80* | (2021.01) |
| *B33Y 50/00* | (2015.01) |
| *G05B 19/4099* | (2006.01) |
| *B33Y 80/00* | (2015.01) |

(52) U.S. Cl.
CPC ............ *B29C 64/386* (2017.08); *B22F 10/80* (2021.01); *B33Y 50/00* (2014.12); *G05B 19/4099* (2013.01); *G05B 2219/35134* (2013.01)

(58) Field of Classification Search
CPC ... B29C 64/386; B29C 64/171; B29C 64/112; B22F 10/80; B33Y 50/00; B33Y 10/00; B33Y 80/00; G05B 19/4099; G05B 2219/35134

USPC .......................................................... 700/98
See application file for complete search history.

(56) References Cited

U.S. PATENT DOCUMENTS

| | | | |
|---|---|---|---|
| 2015/0057784 A1* | 2/2015 | Butler ................... | G06F 3/1288 700/119 |
| 2017/0239883 A1 | 8/2017 | Terada et al. | |
| 2021/0154038 A1 | 5/2021 | Koch et al. | |

(Continued)

FOREIGN PATENT DOCUMENTS

| | | |
|---|---|---|
| DE | 102019131525 A1 | 5/2021 |
| DE | 102021109453 A1 | 3/2022 |

(Continued)

*Primary Examiner* — Michael J Brown
(74) *Attorney, Agent, or Firm* — HAUPTMAN HAM, LLP

(57)              ABSTRACT

A three-dimensional modeled object to be manufactured by additive manufacturing includes a plurality of segments, a hinge structure that couples two adjacent segments among the segments, and a fitting structure including an external fitting portion and an internal fitting portion. The external fitting portion is configured to fit to the internal fitting portion. The three-dimensional modeled object is configured to be displaced between a folded position and an assembled position by the hinge structure. The assembled position is a position in which the three-dimensional modeled object is assembled from the folded position. The three-dimensional modeled object is held in the assembled position by fitting the external fitting portion to the internal fitting portion when the three-dimensional modeled object is in the assembled position.

14 Claims, 17 Drawing Sheets

(56)          References Cited

U.S. PATENT DOCUMENTS

| | | |
|---|---|---|
| 2021/0178693 A1 | 6/2021 | Chung et al. |
| 2022/0089015 A1 | 3/2022 | Wolcott et al. |

FOREIGN PATENT DOCUMENTS

| | | |
|---|---|---|
| JP | 2017-523933 A | 8/2017 |
| JP | 2017149268 A | 8/2017 |
| WO | 2016/018976 A1 | 2/2016 |

* cited by examiner

FIG. 13

THREE-DIMENSIONAL MODELED OBJECT AND METHOD FOR MANUFACTURING THREE-DIMENSIONAL MODELED OBJECT

CROSS-REFERENCE TO RELATED APPLICATION

This application claims priority to Japanese Patent Application No. 2021-169243 filed on Oct. 15, 2021, incorporated herein by reference in its entirety.

BACKGROUND

1. Technical Field

The present disclosure relates to a three-dimensional modeled object and a method for manufacturing the three-dimensional modeled object. The three-dimensional modeled object is manufactured by, for example, additive manufacturing.

2. Description of Related Art

Japanese Unexamined Patent Application Publication No. 2017-149268 (JP 2017-149268 A) discloses a technology for manufacturing a vehicle component by using a three-dimensional (3D) printer.

When using an inkjet 3D printer, there is an advantage in that a unit price per component can be reduced as the number of components to be manufactured in one batch (space inside a manufacturing machine) increases. The number of components to be manufactured in one batch depends on the shape and size of the component. Therefore, the number of components that can be manufactured at one time is small depending on the component, thereby causing not only a material loss during manufacturing and an increase in the manufacturing period (decrease in yield), but also causing an increase in cost.

SUMMARY

The present disclosure provides a three-dimensional modeled object and a method for manufacturing the three-dimensional modeled object, in which the number of components to be manufactured in one batch can be increased.

A first aspect of the present disclosure relates to a three-dimensional modeled object to be manufactured by additive manufacturing. The three-dimensional modeled object includes a plurality of segments, a hinge structure that couples two adjacent segments among the segments, and a fitting structure including an external fitting portion and an internal fitting portion. The two adjacent segments is configured to be bent each other via the hinge structure. The external fitting portion is configured to fit to the internal fitting portion. The three-dimensional modeled object is configured to be displaced between a folded position and an assembled position by the hinge structure. The assembled position is a position in which the three-dimensional modeled object is assembled from the folded position. The three-dimensional modeled object is held in the assembled position by fitting the external fitting portion to the internal fitting portion when the three-dimensional modeled object is in the assembled position.

According to the first aspect, the three-dimensional modeled object is displaceable between the folded position and the assembled position by the hinge structure. Therefore, the three-dimensional modeled object can be manufactured by the additive manufacturing in the folded position. In a case where the three-dimensional modeled objects are manufactured by the additive manufacturing in the assembled position, the three-dimensional modeled objects cannot be laid over one another or only a few three-dimensional modeled objects can be laid over one another. In the case where the three-dimensional modeled objects are manufactured by the additive manufacturing in the folded position, more three-dimensional modeled objects can be laid over one another than those in the case of the assembled position. Therefore, the number of components to be manufactured in one batch (the number of components that can be manufactured at one time or the number of components to be produced per lot) can be increased, thereby improving the yield and reducing the cost. By fitting the external fitting portion to the internal fitting portion, the three-dimensional modeled object in the assembled position is held in the assembled position. Therefore, the three-dimensional modeled object can be held in the assembled position even in the case where the three-dimensional modeled object is manufactured by the additive manufacturing in the folded position. In a case where the three-dimensional modeled object can be displaced from the folded position to the assembled position by hand, the three-dimensional modeled object can be assembled by simply expanding the three-dimensional modeled object by hand, thereby reducing the time and effort required for the assembling.

In the first aspect, the hinge structure may include a first hinge element integrated with one of the two segments coupled by the hinge structure, and a second hinge element integrated with the other of the two segments coupled by the hinge structure, the second hinge element being coupled to the first hinge element. The second hinge element is configured to be pivoted to the first hinge element.

According to the structure described above, the hinge structure includes the first hinge element integrated with one of the two segments coupled by the hinge structure, and the second hinge element integrated with the other of the two segments coupled by the hinge structure and coupled to the first hinge element in a pivotable manner Therefore, a robust hinge structure can be manufactured as compared with a case where the hinge structure is an integral hinge integrated with both of the two segments coupled by the hinge structure.

In the first aspect, the external fitting portion may be provided on the first hinge element, and the internal fitting portion may be provided on the second hinge element.

According to the structure described above, the external fitting portion is provided on the first hinge element, and the internal fitting portion is provided on the second hinge element. Therefore, the fitting structure can be provided on the hinge structure. Thus, it is not necessary to provide the fitting structure on the segments, thereby reducing restriction on the segments caused by the fitting structure.

In the first aspect, the hinge structure may be an integral hinge integrated with both of the two segments coupled by the hinge structure.

According to the structure described above, the hinge structure is the integral hinge integrated with both of the two segments coupled by the hinge structure. Therefore, the hinge structure can be manufactured simply as compared with the case where the hinge structure includes the first hinge element integrated with one of the two segments coupled by the hinge structure and the second hinge element integrated with the other of the two segments coupled by the hinge structure and coupled to the first hinge element in a pivotable manner. Further, the space required for the hinge structure can be reduced, thereby increasing the number of components to be manufactured in one batch when manufacturing the three-dimensional modeled object by the additive manufacturing.

In the first aspect, the external fitting portion may be provided on one of the two segments coupled by the hinge structure, and the internal fitting portion may be provided on the other of the two segments coupled by the hinge structure.

According to the structure described above, the external fitting portion is provided on one of the two segments coupled by the hinge structure, and the internal fitting portion is provided on the other of the two segments coupled by the hinge structure. Therefore, the fitting structure can be provided on the segments. Therefore, it is not necessary to provide the fitting structure on the hinge structure. Thus, the hinge structure can be provided as the integral hinge.

In the first aspect, the three-dimensional modeled object may be a product and may be shaped to have a cavity inside when the three-dimensional modeled object is in the assembled position.

According to the structure described above, the three-dimensional modeled object is a product and is shaped to have the cavity inside when the three-dimensional modeled object is in the assembled position. Therefore, when the three-dimensional modeled object is manufactured by the additive manufacturing in the folded position, the number of components to be manufactured in one batch can be increased as compared with the case of manufacture in the assembled position.

In the first aspect, a first volume of the cavity may be smaller than a second volume of the cavity. The first volume may be a volume of the cavity when the three-dimensional modeled object is in the folded position. The second volume may be a volume of the cavity when the three-dimensional modeled object is in the assembled position.

According to the structure described above, when the three-dimensional modeled object is in the folded position, the volume of the cavity is smaller than the volume when the three-dimensional modeled object is in the assembled position. Therefore, it is possible to efficiently obtain the effect that is obtained in the case where the three-dimensional modeled object is a product and is shaped to have the cavity inside when the three-dimensional modeled object is in the assembled position.

In the first aspect, the three-dimensional modeled object may be a semi-finished product to be provided as a finished product when the three-dimensional modeled object and another three-dimensional modeled object adjacent to each other are coupled to each other.

According to the structure described above, the three-dimensional modeled object is the semi-finished product to be provided as a finished product when the two adjacent three-dimensional modeled objects are coupled to each other. Therefore, the components to be manufactured by the additive manufacturing can be downsized and the number of components to be manufactured in one batch can be increased as compared with a case where the three-dimensional modeled object is a finished product.

In the first aspect, the three-dimensional modeled object and the other three-dimensional modeled object adjacent to each other may be coupled to each other by fitting a fitting protrusion provided on one of the three-dimensional modeled object and the other three-dimensional modeled object to a fitting receptacle provided on the other of the three-dimensional modeled object and the other three-dimensional modeled object.

According to the structure described above, the two adjacent three-dimensional modeled objects are coupled to each other by fitting the fitting protrusion on one of the two three-dimensional modeled objects to the fitting receptacle on the other of the two three-dimensional modeled objects. Therefore, the three-dimensional modeled objects can be coupled to each other relatively simply.

A second aspect of the present disclosure relates to a method for manufacturing a three-dimensional modeled object by additive manufacturing. The manufacturing method includes a manufacturing step for manufacturing the three-dimensional modeled object by the additive manufacturing in a folded position in which the three-dimensional modeled object in an assembled position is folded by a hinge structure, and an assembling step for displacing the three-dimensional modeled object from the folded position to the assembled position.

According to the second aspect, the method includes the manufacturing step for manufacturing the three-dimensional modeled object by the additive manufacturing in the folded position in which the three-dimensional modeled object in the assembled position is folded by the hinge structure. Even if the three-dimensional modeled objects cannot be laid over one another or only a few three-dimensional modeled objects can be laid over one another in the case of being manufactured in the assembled position during the manufacturing step, more three-dimensional modeled objects can be laid over one another in the case of being manufactured in the folded position, as compared with the case of the assembled position. Therefore, the number of components to be manufactured in one batch (the number of components that can be manufactured at one time or the number of components to be produced per lot) can be increased, thereby improving the yield and reducing the cost. The method includes the assembling step for displacing the three-dimensional modeled object from the folded position to the assembled position. In a case where the three-dimensional modeled object can be displaced from the folded position to the assembled position by hand, the three-dimensional modeled object can be assembled by simply expanding the three-dimensional modeled object by hand, thereby reducing the time and effort required for the assembling.

In the second aspect, in the assembling step, an external fitting portion of a fitting structure may be fitted to an internal fitting portion by displacing the three-dimensional modeled object from the folded position to the assembled position.

According to the structure described above, in the assembling step, the external fitting portion is fitted to the internal fitting portion by displacing the three-dimensional modeled object from the folded position to the assembled position. Therefore, the three-dimensional modeled object can be held in the assembled position. Since the external fitting portion can be fitted to the internal fitting portion by simply displacing the three-dimensional modeled object from the folded position to the assembled position, it is not necessary to fit the external fitting portion to the internal fitting portion after the three-dimensional modeled object is displaced from the folded position to the assembled position. Thus, an advantage is obtained in terms of cost.

In the second aspect, the three-dimensional modeled object may be a product and may be shaped to have a cavity inside when the three-dimensional modeled object is in the assembled position. In the manufacturing step, the three-dimensional modeled object may be manufactured in the folded position. The three-dimensional modeled object may be folded in the folded position such that a first volume is smaller than a second volume. The first volume may be a volume of the cavity when the three-dimensional modeled object is in the folded position. The second volume may be a volume of the cavity when the three-dimensional modeled object is in the assembled position.

According to the structure described above, in the manufacturing step, the three-dimensional modeled object is manufactured in the folded position in which the three-dimensional modeled object is folded to reduce the volume of the cavity as compared with the volume when the three-dimensional modeled object is in the assembled position. Therefore, the number of components to be manufactured in one batch can be increased as compared with the case of manufacture in the assembled position.

In the second aspect, the three-dimensional modeled object may be a semi-finished product to be provided as a finished product when the three-dimensional modeled object and another three-dimensional modeled object adjacent to each other are coupled to each other, and the three-dimensional modeled object that is the semi-finished product may be manufactured through the manufacturing step and the assembling step.

According to the structure described above, the three-dimensional modeled object that is the semi-finished product is manufactured through the manufacturing step and the assembling step. Therefore, the components to be manufactured by the additive manufacturing can be downsized and the number of components to be manufactured in one batch can be increased as compared with the case where the three-dimensional modeled object is a finished product.

In the second aspect, the manufacturing method may include a coupling step for coupling the three-dimensional modeled object and the other three-dimensional modeled object adjacent to each other after the assembling step.

According to the structure described above, the method includes the coupling step for coupling the two adjacent three-dimensional modeled objects to each other after the assembling step. Therefore, the three-dimensional modeled objects can be coupled to each other.

A third aspect of the present disclosure relates to a three-dimensional modeled object. The three-dimensional modeled object includes two segments, a hinge structure that couples the two segments, and a fitting structure including an external fitting portion and an internal fitting portion. The two segments are configured to be bent each other via the hinge structure. The external fitting portion is configured to fit to the internal fitting portion. The three-dimensional modeled object is configured to be displaced between a folded position and an assembled position by the hinge structure. The assembled position may be a position in which the three-dimensional modeled object is assembled from the folded position. The three-dimensional modeled object is held in the assembled position by fitting the external fitting portion to the internal fitting portion.

According to the third aspect, the three-dimensional modeled object is displaceable between the folded position and the assembled position by the hinge structure. Therefore, the three-dimensional modeled object can be manufactured by the additive manufacturing in the folded position. In a case where the three-dimensional modeled objects are manufactured by the additive manufacturing in the assembled position, the three-dimensional modeled objects cannot be laid over one another or only a few three-dimensional modeled objects can be laid over one another. In the case where the three-dimensional modeled objects are manufactured by the additive manufacturing in the folded position, more three-dimensional modeled objects can be laid over one another than those in the case of the assembled position. Therefore, the number of components to be manufactured in one batch (the number of components that can be manufactured at one time or the number of components to be produced per lot) can be increased, thereby improving the yield and reducing the cost. By fitting the external fitting portion to the internal fitting portion, the three-dimensional modeled object in the assembled position is held in the assembled position. Therefore, the three-dimensional modeled object can be held in the assembled position even in the case where the three-dimensional modeled object is manufactured by the additive manufacturing in the folded position. In a case where the three-dimensional modeled object can be displaced from the folded position to the assembled position by hand, the three-dimensional modeled object can be assembled by simply expanding the three-dimensional modeled object by hand, thereby reducing the time and effort required for the assembling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is a front view of the three-dimensional modeled objects of the third embodiment in a folded position;

DETAILED DESCRIPTION OF EMBODIMENTS

Figure 8:
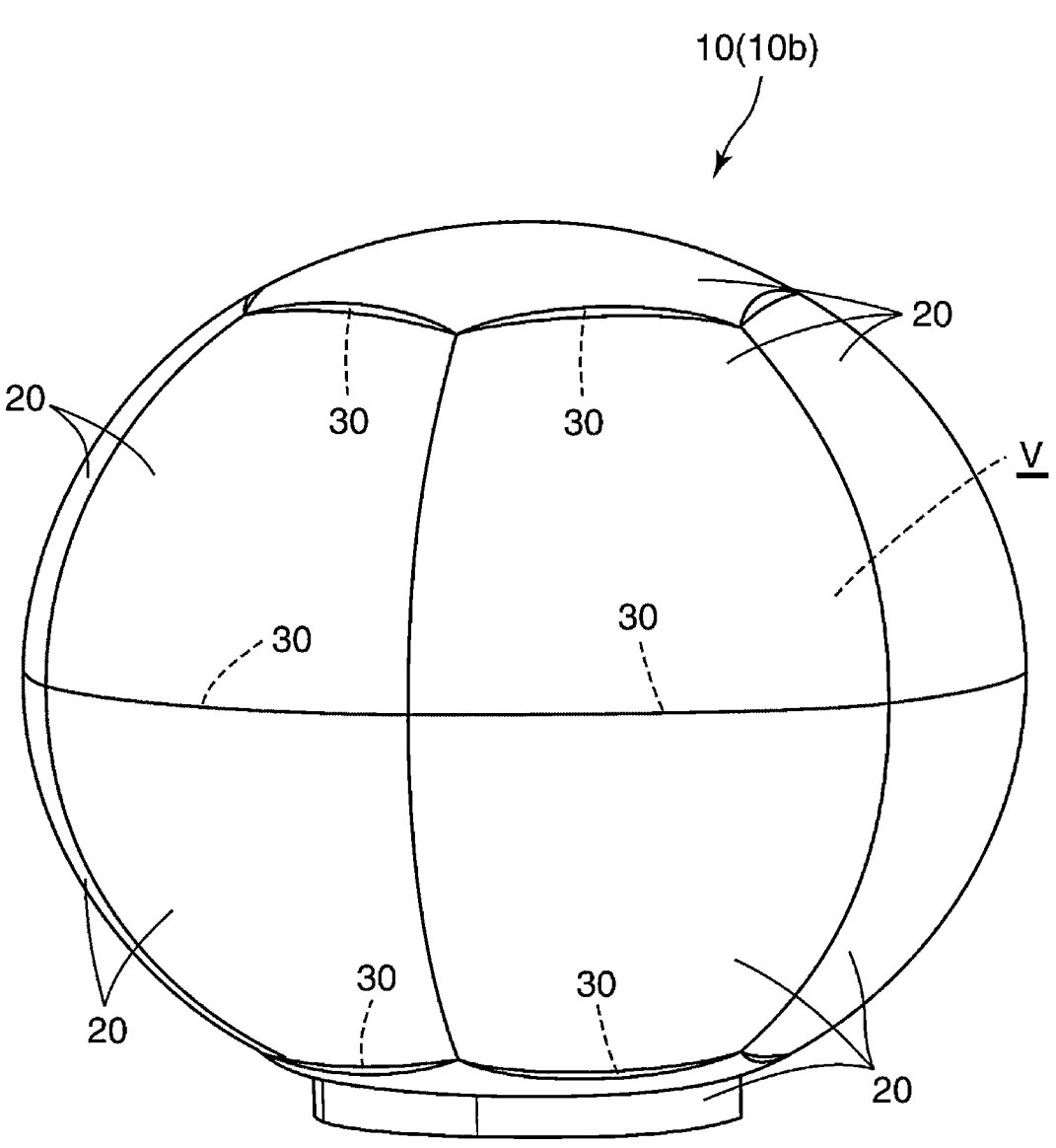
FIG. 8 is a perspective view of a three-dimensional modeled object of a second embodiment in an assembled position.
Figure 9:
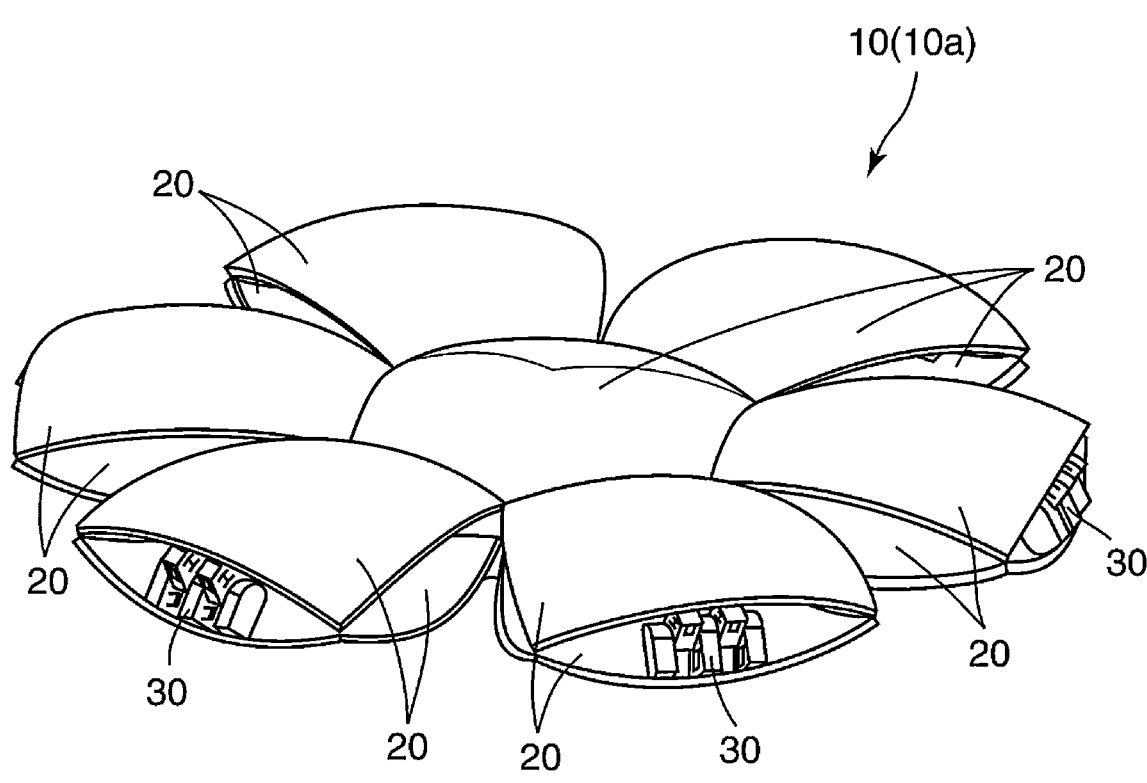
FIG. 9 is a perspective view of the three-dimensional modeled object of the second embodiment in a folded position.
Figure 10:
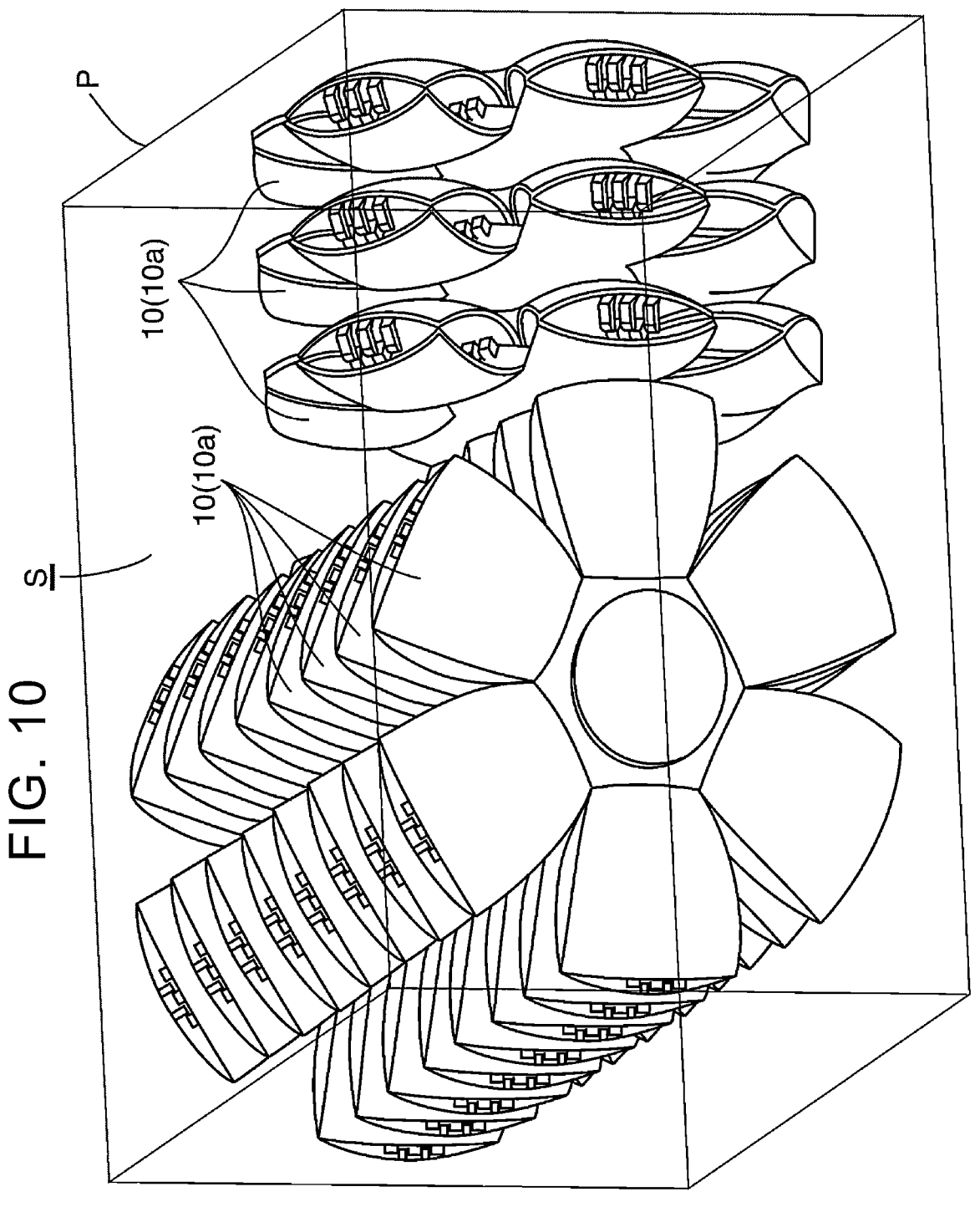
FIG. 10 is a perspective view showing how the three-dimensional modeled objects of the second embodiment are manufactured in one batch in the folded position.

Hereinafter, three-dimensional modeled objects and methods for manufacturing the three-dimensional modeled objects according to a plurality of embodiments of the present disclosure will be described with reference to the drawings. FIGS. 1 to 7B show a three-dimensional modeled object of a first embodiment. FIGS. 8 to 10 show a three-dimensional modeled object of a second embodiment. FIGS. 11 to 15B show a three-dimensional modeled object of a third embodiment.

Parts that are common or similar across the embodiments are represented by the same reference symbols across the embodiments. First, parts common to the embodiments will be described.

Three-dimensional modeled objects 10 of the embodiments are three-dimensional structures manufactured by additive manufacturing using a 3D printer P. The three-dimensional modeled object 10 may be made of resin or metal. The three-dimensional modeled object 10 includes a plurality of segments 20, a hinge structure 30, and a fitting structure 40.

Figure 1:
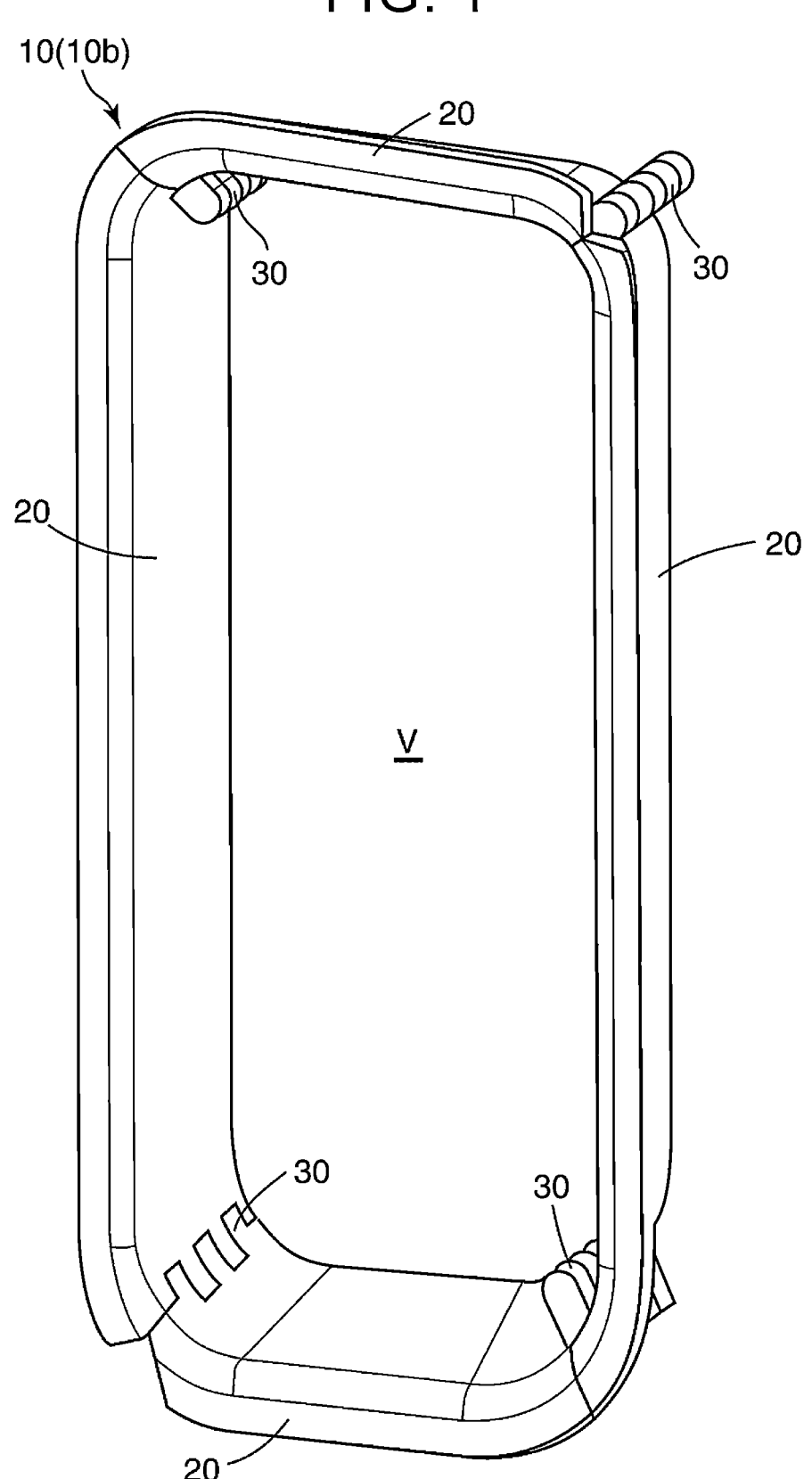
FIG. 1 is a perspective view of a three-dimensional modeled object of a first embodiment in an assembled position.
Figure 2:
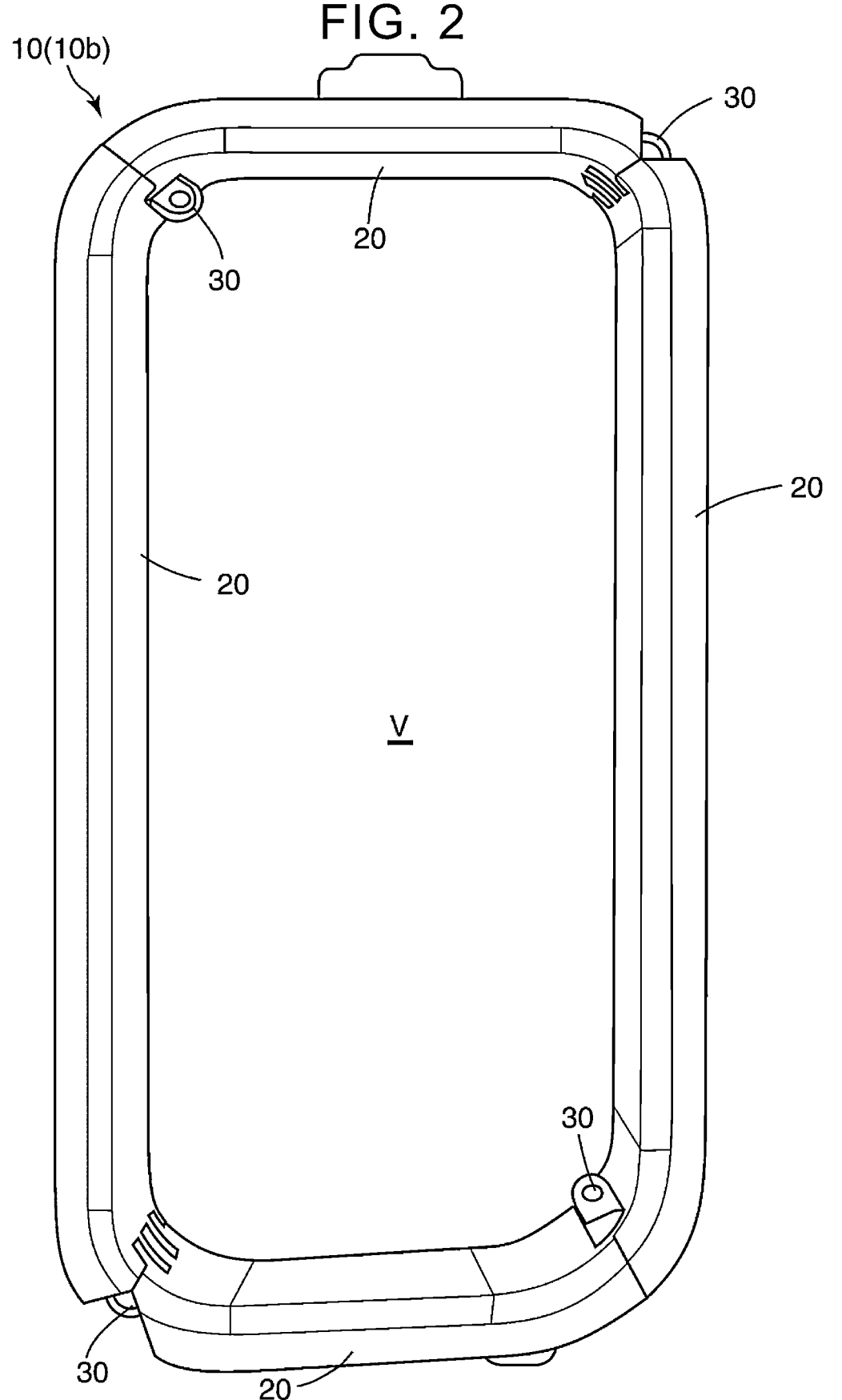
FIG. 2 is a front view of the three-dimensional modeled object of the first embodiment in the assembled position.
Figure 3:
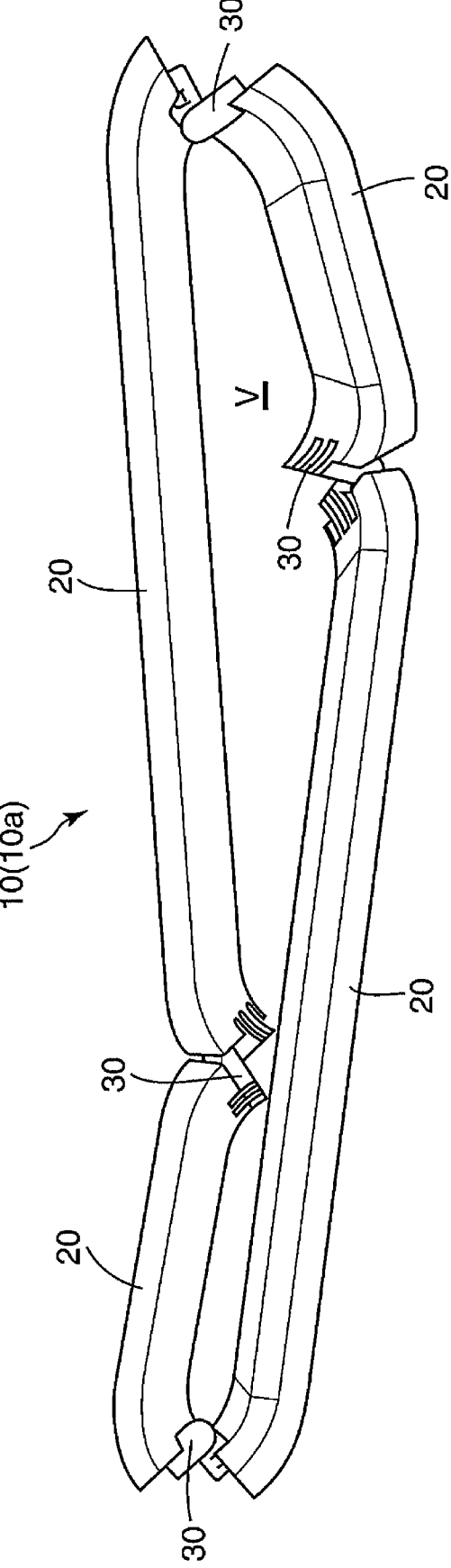
FIG. 3 is a front view of the three-dimensional modeled object of the first embodiment in a folded position.

As shown in FIGS. 1 to 3, the plurality of segments 20 is provided. The segments 20 may have the same shape or different shapes.

The hinge structure 30 couples two adjacent segments 20 among the plurality of segments 20 in a bendable (pivotable or swingable) manner With the hinge structure 30, the three-dimensional modeled object 10 can be displaced, as shown in FIGS. 2 and 3, between a folded position 10a and an assembled position (unfolded position) 10b in which the three-dimensional modeled object 10 in the folded position 10a is assembled (unfolded). In a case where a plurality of hinge structures 30 is provided, the pivot axes of the hinge structures 30 may be parallel or non-parallel to each other as long as the three-dimensional modeled object 10 can be displaced between the folded position 10a and the assembled position 10b.

Figure 5:
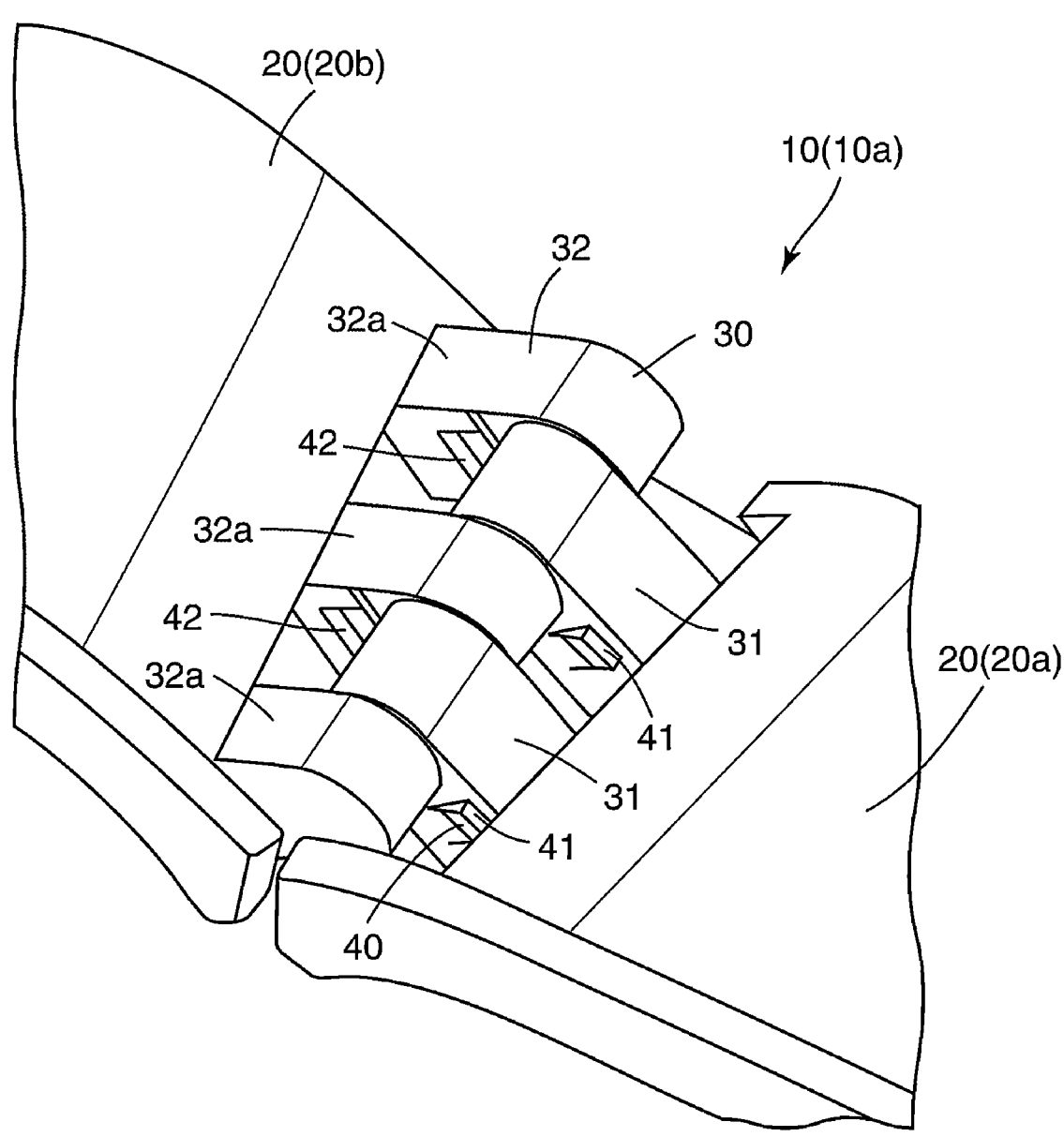
FIG. 5 is a partially enlarged perspective view of the three-dimensional modeled object of the first embodiment in the folded position.
Figure 6:
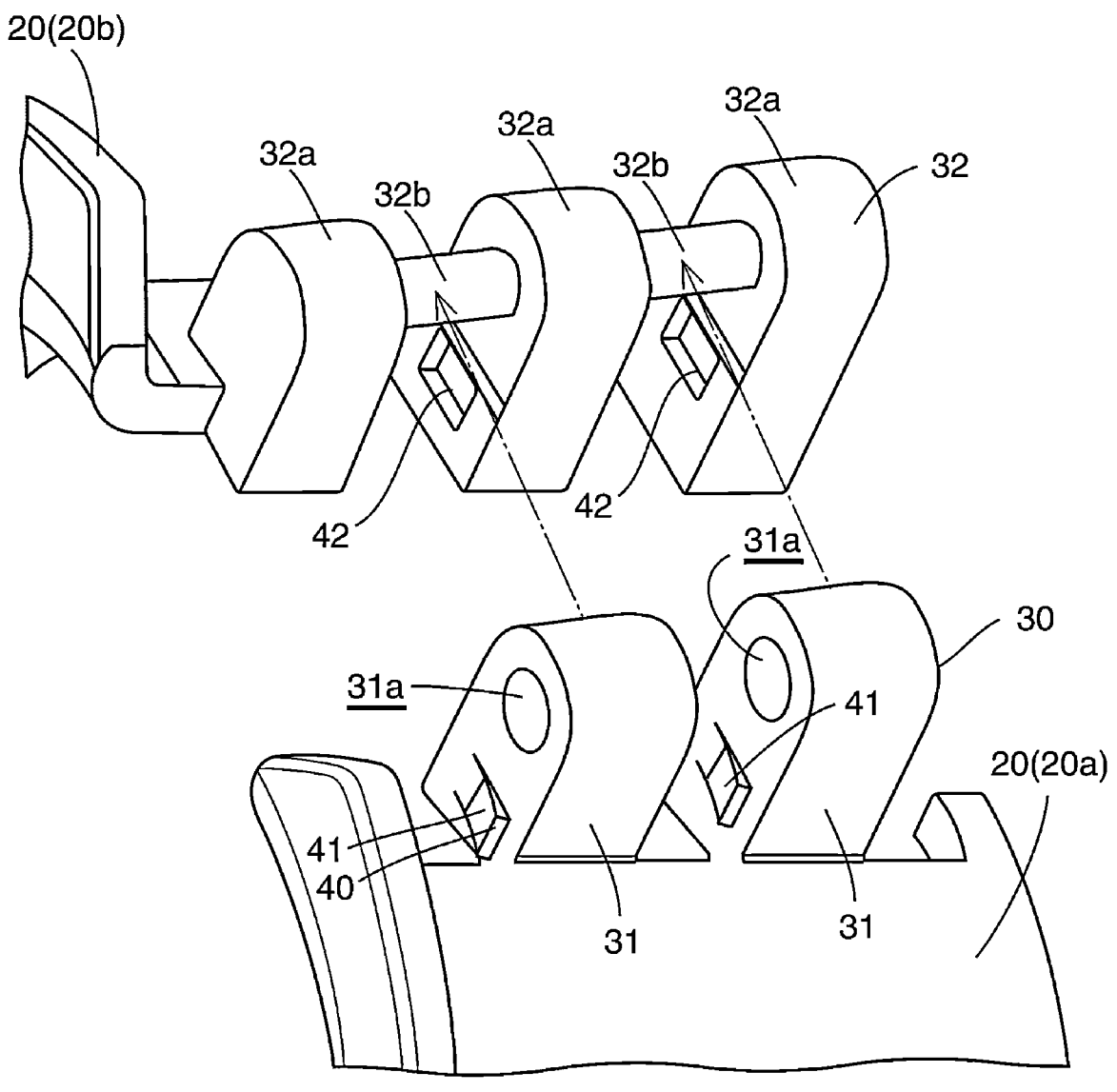
FIG. 6 is an exploded perspective view of FIG. 5.
Figure 7A:
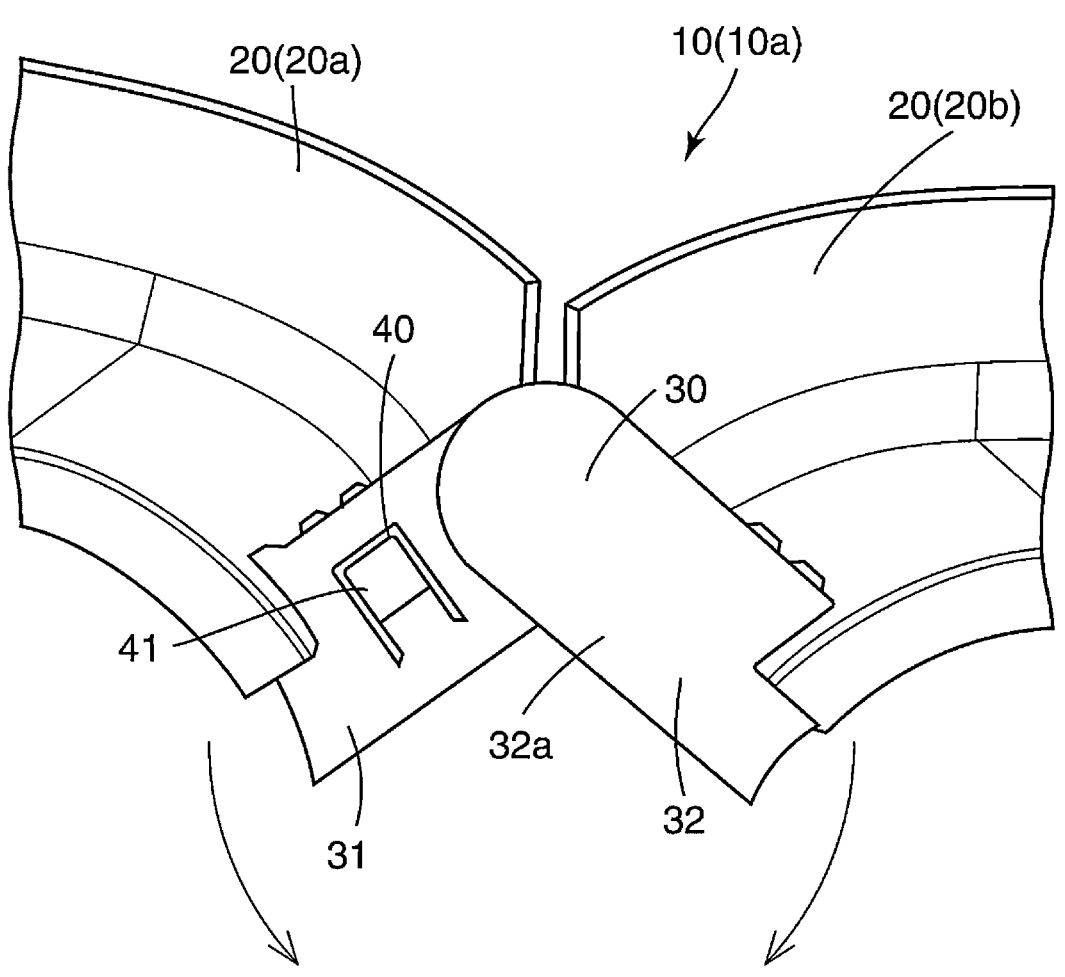
FIG. 7A is a partially enlarged front view of the three-dimensional modeled object of the first embodiment in the folded position.
Figure 7B:
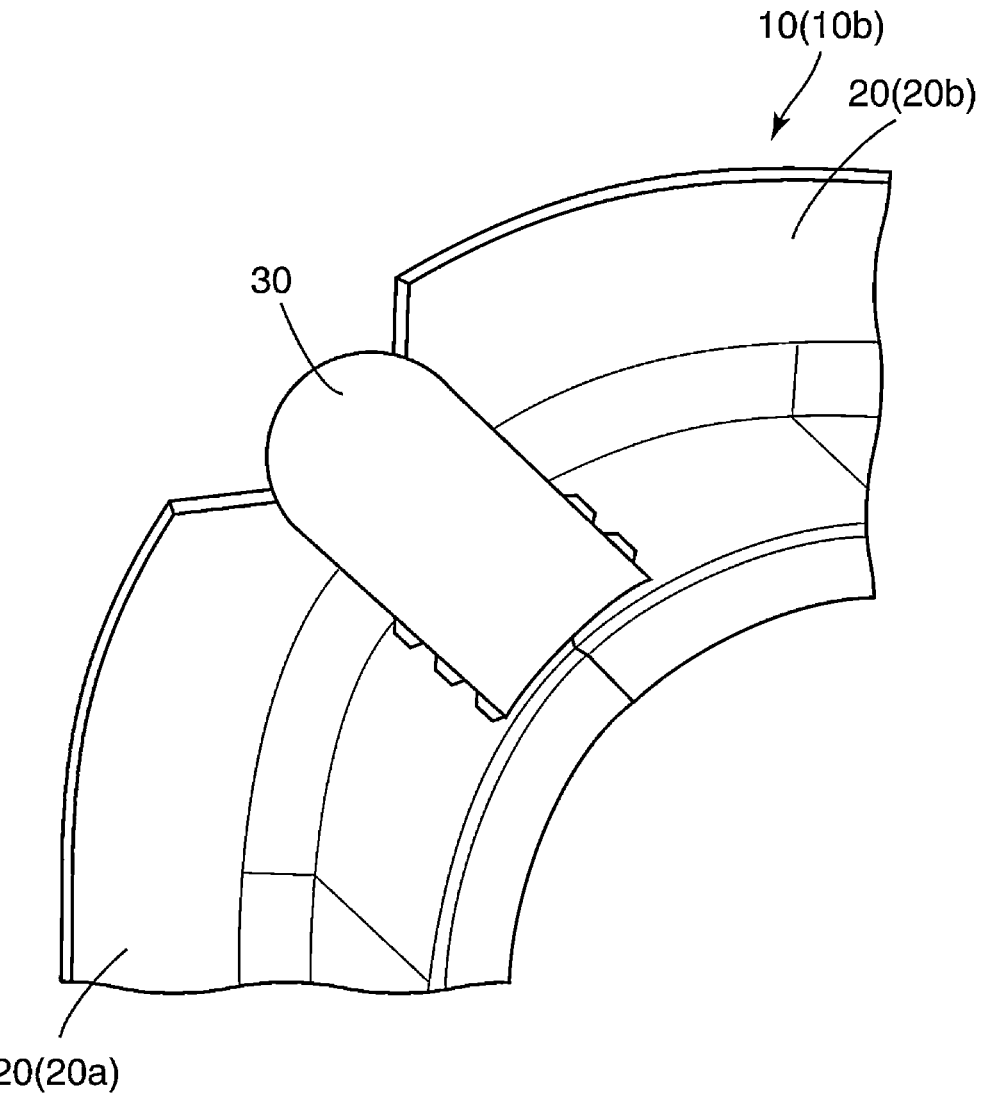
FIG. 7B is a partially enlarged front view of the three-dimensional modeled object of the first embodiment in the assembled position.

As shown in FIGS. 5 and 6, the hinge structure 30 includes a first hinge element 31 integrated with a first segment 20a that is one of the two segments 20 coupled by the hinge structure 30, and a second hinge element 32 integrated with a second segment 20b that is the other of the two segments 20 coupled by the hinge structure 30 and coupled to the first hinge element 31 in a pivotable manner.

The first hinge element 31 protrudes from the first segment 20a toward the second segment 20b. One first hinge element 31 or a plurality of first hinge elements 31 may be provided on the first segment 20a. In the illustrated example, two first hinge elements 31 are provided on the first segment 20a. The first hinge element 31 has a through hole 31a extending through the first hinge element 31.

The second hinge element 32 includes a protruding portion 32a that protrudes from the second segment 20b toward the first segment 20a, and a shaft portion 32b integrated with the protruding portion 32a. One protruding portion 32a or a plurality of protruding portions 32a may be provided on the second segment 20b. In the illustrated example, three protruding portions 32a are provided on the second segment 20b. The shaft portion 32b is integrated with the protruding portion 32a, and is inserted into the through hole 31a of the first hinge element 31. Therefore, the first hinge element 31 and the second hinge element 32 are pivotable about the shaft portion 32b.

The fitting structure 40 is provided such that the three-dimensional modeled object 10 in the assembled position 10b is held in the assembled position 10b. The fitting structure 40 includes an external fitting portion 41 and an internal fitting portion 42 where the external fitting portion 41 can be fitted or detached.

The external fitting portion 41 is formed on the first hinge element 31, and the internal fitting portion 42 is formed on the protruding portion 32a of the second hinge element 32. The external fitting portion 41 is integrated with the first hinge element 31 in an elastically displaceable manner. The internal fitting portion 42 is a recess or a hole formed in the second hinge element 32. The external fitting portion 41 is not fitted to the internal fitting portion 42 when the three-dimensional modeled object 10 is in the folded position 10a, and is fitted to the internal fitting portion 42 when the three-dimensional modeled object 10 is in the assembled position 10b. Since the external fitting portion 41 is fitted to the internal fitting portion 42 when the three-dimensional modeled object 10 is in the assembled position 10b, the three-dimensional modeled object 10 can be held in the assembled position 10b.

Figure 15A:
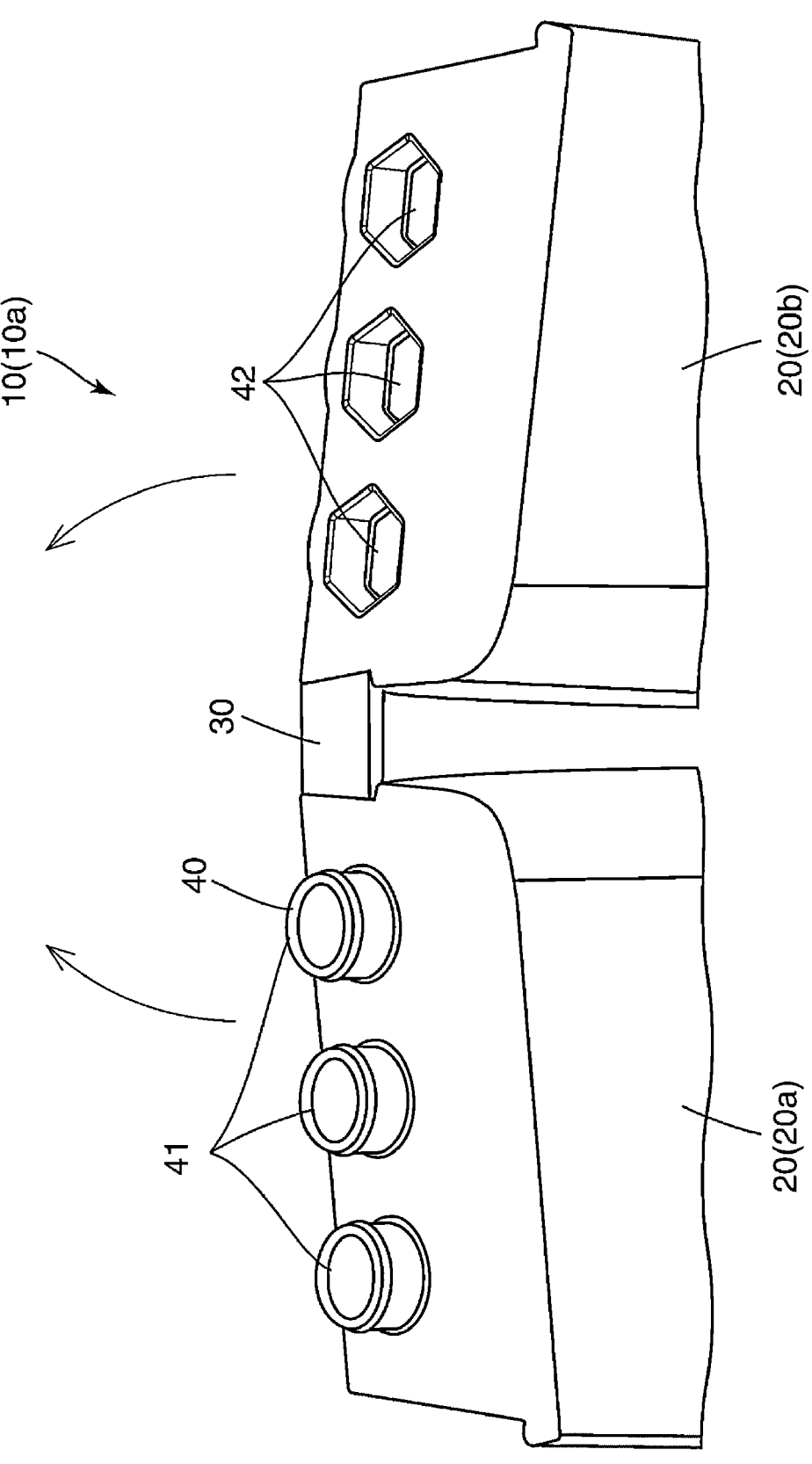
FIG. 15A is a partially enlarged perspective view of the three-dimensional modeled object of the third embodiment in the folded position.
Figure 15B:
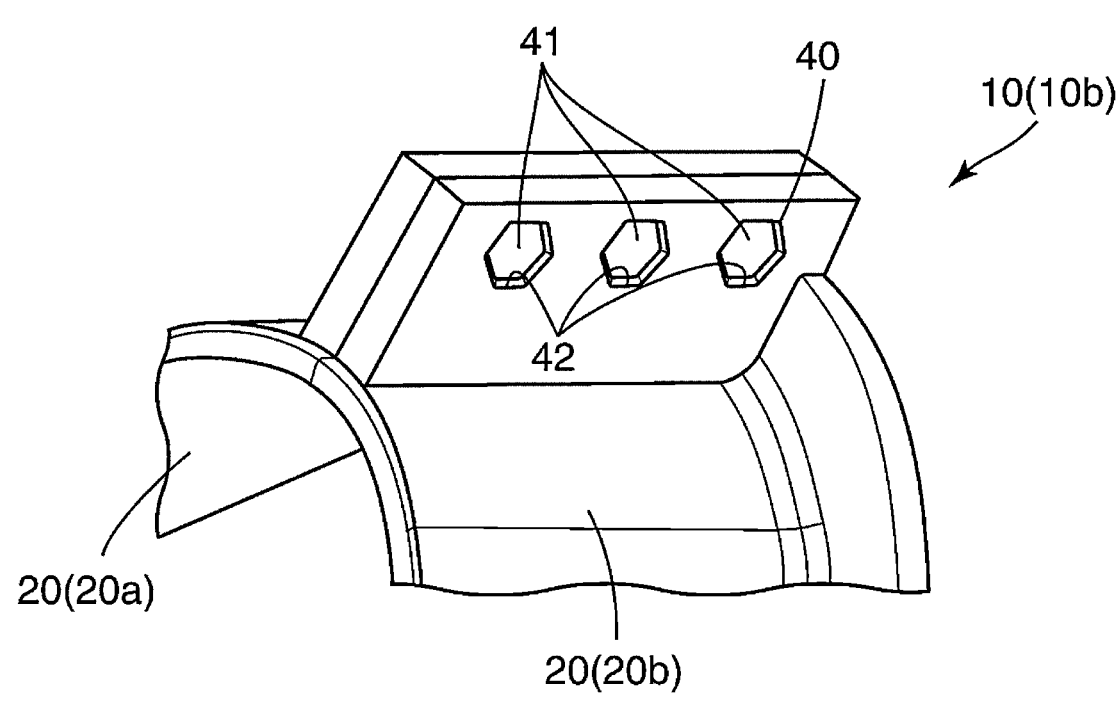
FIG. 15B is a partially enlarged perspective view of the three-dimensional modeled object of the third embodiment in the assembled position.

The hinge structure 30 and the fitting structure 40 are not limited to the structures described above. For example, as shown in FIGS. 15A and 15B, the hinge structure 30 may be an integral hinge integrated with both of the two segments 20 (20a, 20b) coupled by the hinge structure 30 without the first and second hinge elements 31 and 32. In this case, the hinge structure 30 is thinner than the two segments 20 (20a, 20b) coupled by the hinge structure 30, and can be deformed with a relatively small force. The fitting structure 40 need not be provided on the hinge structure 30. The external fitting portion 41 may be formed on the first segment 20a, and the internal fitting portion 42 may be formed on the second segment 20b.

Figure 4:
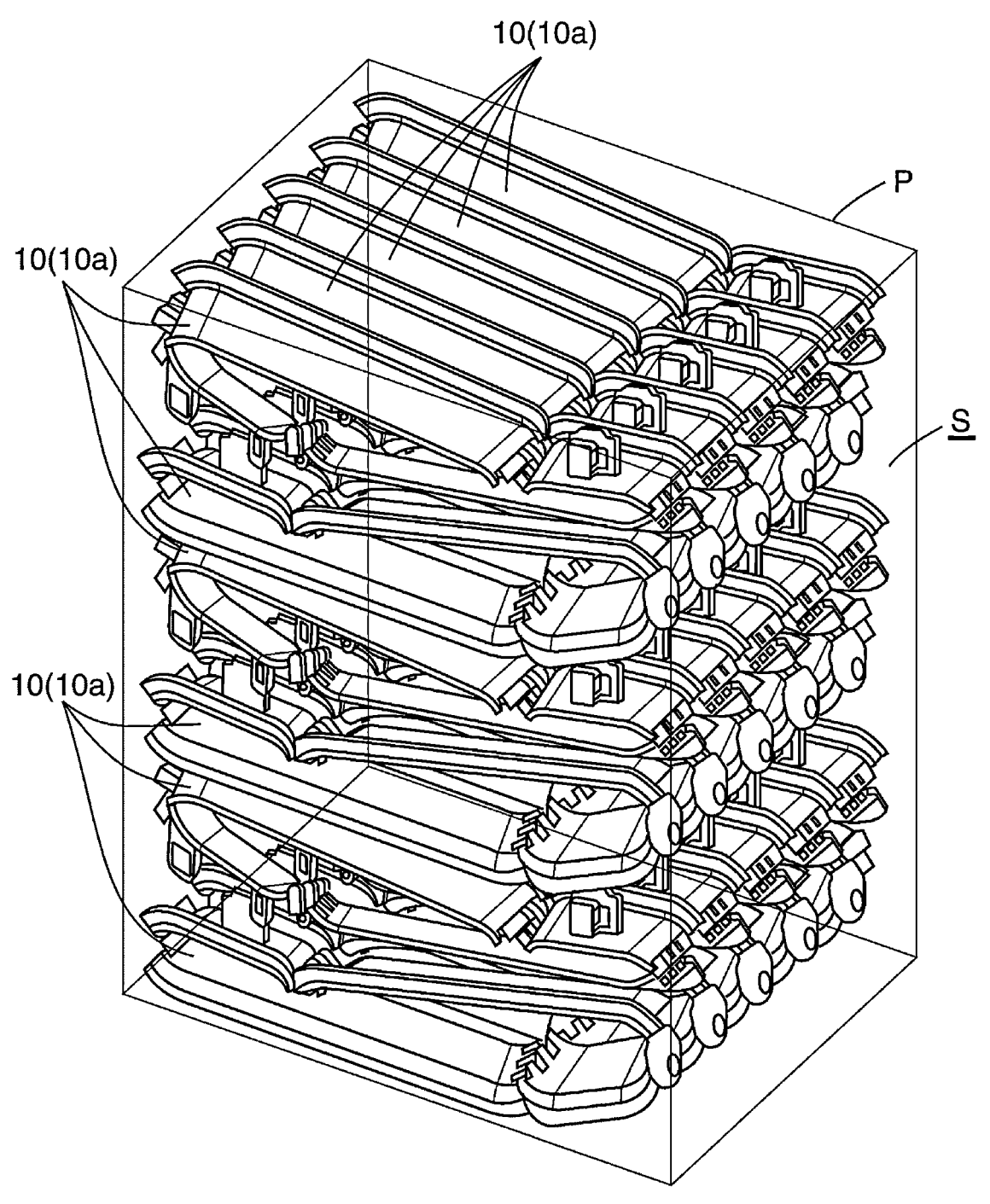
FIG. 4 is a perspective view showing how the three-dimensional modeled objects of the first embodiment are manufactured in one batch in the folded position.

Description will be given of a method for manufacturing the three-dimensional modeled object 10, which is common to the embodiments. The method for manufacturing the three-dimensional modeled object 10 includes (i) a manufacturing step for manufacturing the three-dimensional modeled object 10 by additive manufacturing using the 3D printer P in the folded position 10a in which the three-dimensional modeled object 10 in the assembled position 10b is folded by the hinge structure 30 as shown in FIG. 4, and (ii) an assembling step for displacing the three-dimensional modeled object 10 from the folded position 10a to the assembled position 10b after the manufacturing step as shown in FIGS. 2 and 3.

In the assembling step (ii), the external fitting portion 41 of the fitting structure 40 is fitted to the internal fitting portion 42 by displacing the three-dimensional modeled object 10 from the folded position 10a to the assembled position 10b. That is, the external fitting portion 41 is fitted to the internal fitting portion 42 by simply displacing the three-dimensional modeled object 10 from the folded position 10a to the assembled position 10b.

Actions and effects common to the embodiments will be described.

(A1) The three-dimensional modeled object 10 can be displaced between the folded position 10a and the assembled position 10b by the hinge structure 30. Therefore, the three-dimensional modeled object 10 can be manufactured by additive manufacturing in the folded position 10a.

In a case where the three-dimensional modeled objects 10 are manufactured by additive manufacturing in the assembled position 10*b*, the three-dimensional modeled objects 10 cannot be laid over one another or only a few three-dimensional modeled objects 10 can be laid over one another. In the case where the three-dimensional modeled objects 10 are manufactured by additive manufacturing in the folded position 10*a* as shown in FIG. 4, more three-dimensional modeled objects 10 can be laid over one another than those in the case of the assembled position 10*b*. Therefore, the number of components to be manufactured in one batch S (the number of components that can be manufactured at one time or the number of components to be produced per lot) can be increased, thereby improving the yield and reducing the cost.

(A2) By fitting the external fitting portion 41 to the internal fitting portion 42 as shown in FIGS. 5 to 7B, the three-dimensional modeled object 10 in the assembled position 10*b* is held in the assembled position 10*b*. Therefore, the three-dimensional modeled object 10 can be held in the assembled position 10*b* even in the case where the three-dimensional modeled object 10 is manufactured by additive manufacturing in the folded position 10*a*. In a case where the three-dimensional modeled object 10 can be displaced from the folded position 10*a* to the assembled position 10*b* by hand, the three-dimensional modeled object 10 can be assembled by simply expanding the three-dimensional modeled object 10 by hand, thereby reducing the time and effort required for the assembling.

(A3) The hinge structure 30 includes the first hinge element 31 integrated with the first segment 20*a* that is one of the two segments 20 coupled by the hinge structure 30, and the second hinge element 32 integrated with the second segment 20*b* that is the other of the two segments 20 coupled by the hinge structure 30 and coupled to the first hinge element 31 in a pivotable manner Therefore, a robust hinge structure 30 can be manufactured as compared with the case where the hinge structure 30 is the integral hinge integrated with both of the two segments 20 (20*a*, 20*b*) coupled by the hinge structure 30.

(A4) The external fitting portion 41 is formed on the first hinge element 31, and the internal fitting portion 42 is formed on the second hinge element 32. Therefore, the fitting structure 40 can be provided on the hinge structure 30. Thus, it is not necessary to provide the fitting structure 40 on the segments 20, thereby reducing restriction on the segments 20 caused by the fitting structure 40.

(A5) In the case where the hinge structure 30 is the integral hinge integrated with both of the two segments 20 (20*a*, 20*b*) coupled by the hinge structure 30 as shown in FIGS. 15A and 15B, (a) the hinge structure 30 can be manufactured simply as compared with the case where the hinge structure 30 includes the first hinge element 31 integrated with the first segment 20*a* that is one of the two segments 20 coupled by the hinge structure 30 and the second hinge element 32 integrated with the second segment 20*b* that is the other of the two segments 20 coupled by the hinge structure 30 and coupled to the first hinge element 31 in a pivotable manner. Further, (b) the space required for the hinge structure 30 can be reduced, thereby increasing the number of components to be manufactured in the one batch S when manufacturing the three-dimensional modeled object 10 by additive manufacturing.

(A6) In the case where the external fitting portion 41 is formed on the first segment 20*a* that is one of the two segments 20 coupled by the hinge structure 30 and the internal fitting portion 42 is formed on the second segment 20*b* that is the other of the two segments 20 coupled by the hinge structure 30, the fitting structure 40 can be provided on the segments 20. Therefore, it is not necessary to provide the fitting structure 40 on the hinge structure 30. Thus, the hinge structure 30 can be provided as the integral hinge.

According to the method for manufacturing the three-dimensional modeled object 10, which is common to the embodiments, the following actions and effects can be obtained.

(B1) As shown in FIG. 4, the method includes the manufacturing step for manufacturing the three-dimensional modeled object 10 by additive manufacturing in the folded position 10*a* in which the three-dimensional modeled object 10 in the assembled position 10*b* is folded by the hinge structure 30. Even if the three-dimensional modeled objects 10 cannot be laid over one another or only a few three-dimensional modeled objects 10 can be laid over one another in the case of being manufactured in the assembled position 10*b* during the manufacturing step, more three-dimensional modeled objects 10 can be laid over one another in the case of being manufactured in the folded position 10*a*, as compared with the case of the assembled position 10*b*. Therefore, the number of components to be manufactured in one batch S (the number of components that can be manufactured at one time or the number of components to be produced per lot) can be increased, thereby improving the yield and reducing the cost.

(B2) The method includes the assembling step for displacing the three-dimensional modeled object 10 from the folded position 10*a* to the assembled position 10*b*. In a case where the three-dimensional modeled object 10 can be displaced from the folded position 10*a* to the assembled position 10*b* by hand, the three-dimensional modeled object 10 can be assembled by simply expanding the three-dimensional modeled object 10 by hand, thereby reducing the time and effort required for the assembling.

(B3) In the assembling step, the external fitting portion 41 is fitted to the internal fitting portion 42 by displacing the three-dimensional modeled object 10 from the folded position 10*a* to the assembled position 10*b*. Therefore, the three-dimensional modeled object 10 can be held in the assembled position 10*b*. Since the external fitting portion 41 can be fitted to the internal fitting portion 42 by simply displacing the three-dimensional modeled object 10 from the folded position 10*a* to the assembled position 10*b*, it is not necessary to fit the external fitting portion 41 to the internal fitting portion 42 after the three-dimensional modeled object 10 is displaced from the folded position 10*a* to the assembled position 10*b*. Thus, an advantage is obtained in terms of cost.

Next, parts unique to the individual embodiments will be described. FIGS. 1 to 7B are diagrams of the first embodiment. In the first embodiment, as shown in FIG. 1, the three-dimensional modeled object 10 is a product and is shaped to have a cavity V inside when the three-dimensional modeled object 10 is in the assembled position 10*b*. The three-dimensional modeled object 10 has a substantially rectangular frame shape, and is used, for example, for a front duct provided in a vehicle.

Each segment 20 is shaped into a rod extending substantially linearly. The hinge structure 30 is provided at each corner of the three-dimensional modeled object 10 when the three-dimensional modeled object 10 is in the assembled position 10*b*. As shown in FIGS. 5 and 6, the hinge structure 30 includes the first and second hinge elements 31 and 32. In the fitting structure 40, the external fitting portion 41 is formed on the first hinge element 31, and the internal fitting portion 42 is formed on the protruding portion 32*a* of the second hinge element 32.

The pivot axes of all the hinge structures 30 are parallel. Therefore, the frame-shaped three-dimensional modeled object 10 can be displaced between the folded position 10*a* and the assembled position 10*b*.

Since the three-dimensional modeled object 10 has the substantially rectangular frame shape, the three-dimensional modeled object 10 has the cavity V inside when the three-dimensional modeled object 10 is in the assembled position 10*b*. As shown in FIGS. 2 and 3, when the three-dimensional modeled object 10 is in the folded position 10*a*, the volume of the cavity V is smaller than that when the three-dimensional modeled object 10 is in the assembled position 10*b*.

In the first embodiment, the method for manufacturing the three-dimensional modeled object 10 is as follows. In the manufacturing step (step (i)), the three-dimensional modeled object 10 is manufactured in the folded position 10*a* in which the three-dimensional modeled object 10 is folded by using the cavity V to reduce the volume of the cavity V as compared with that in the assembled position 10*b*.

In the first embodiment, the following actions and effects can be obtained in addition to the actions and effects obtained from the parts common to the embodiments ((A1) to (A6) and (B1) to (B3)).

(A7) The three-dimensional modeled object 10 is shaped to have the cavity V inside when the three-dimensional modeled object 10 is in the assembled position 10*b*. Therefore, when the three-dimensional modeled object 10 is manufactured by additive manufacturing in the folded position 10*a*, the number of components to be manufactured in the one batch S can be increased as compared with the case of manufacture in the assembled position 10*b*.

(A8) When the three-dimensional modeled object 10 is in the folded position 10*a*, the volume of the cavity V is smaller than that when the three-dimensional modeled object 10 is in the assembled position 10*b*. Therefore, the effect (A7) can be obtained efficiently.

(B4) In the manufacturing step, the three-dimensional modeled object 10 is manufactured in the folded position 10*a* in which the three-dimensional modeled object 10 is folded to reduce the volume of the cavity V as compared with that in the assembled position 10*b*. Therefore, the number of components to be manufactured in the one batch S can be increased as compared with the case of manufacture in the assembled position 10*b*.

FIGS. 8 to 10 are diagrams of the second embodiment. In the second embodiment, the three-dimensional modeled object 10 is a product and is shaped to have the cavity V inside when the three-dimensional modeled object 10 is in the assembled position 10*b*. The three-dimensional modeled object 10 has a substantially spherical shape.

Each segment 20 is shaped to serve as a part of the surface of the sphere. The number of the segments 20 is not particularly limited. In FIG. 8, a total of 14 segments 20 are provided, including seven segments 20 constituting an upper half of the three-dimensional modeled object 10 and seven segments 20 constituting a lower half of the three-dimensional modeled object 10. The hinge structure 30 includes the first and second hinge elements 31 and 32. In the fitting structure 40, the external fitting portion 41 is formed on the first hinge element 31, and the internal fitting portion 42 is formed on the protruding portion 32*a* of the second hinge element 32.

The pivot axes of the hinge structures 30 vertically arrayed in FIG. 8 are parallel to each other, but the pivot axes of the hinge structures 30 horizontally arrayed in FIG. 8 are not parallel to each other. Therefore, the spherical three-dimensional modeled object 10 can be displaced between the folded position 10*a* and the assembled position 10*b*.

Since the three-dimensional modeled object 10 has the substantially spherical shape, the three-dimensional modeled object 10 has the cavity V inside when the three-dimensional modeled object 10 is in the assembled position 10*b*. As shown in FIGS. 8 and 9, when the three-dimensional modeled object 10 is in the folded position 10*a*, the volume of the cavity V is smaller than that when the three-dimensional modeled object 10 is in the assembled position 10*b*.

In the second embodiment, the method for manufacturing the three-dimensional modeled object 10 is as follows similarly to the first embodiment. In the manufacturing step (step (i)), the three-dimensional modeled object 10 is manufactured in the folded position 10*a* in which the three-dimensional modeled object 10 is folded by using the cavity V to reduce the volume of the cavity V as compared with that in the assembled position 10*b*.

In the second embodiment, the actions and effects (A7), (A8), and (B4) can be obtained in addition to the actions and effects obtained from the parts common to the embodiments ((A1) to (A6) and (B1) to (B3)) similarly to the first embodiment.

FIGS. 11 to 15B are diagrams of the third embodiment. In the third embodiment, the three-dimensional modeled object 10 is a semi-finished product to be provided as a finished product when two adjacent three-dimensional modeled objects 10 are coupled (joined) to each other.

Figure 12:
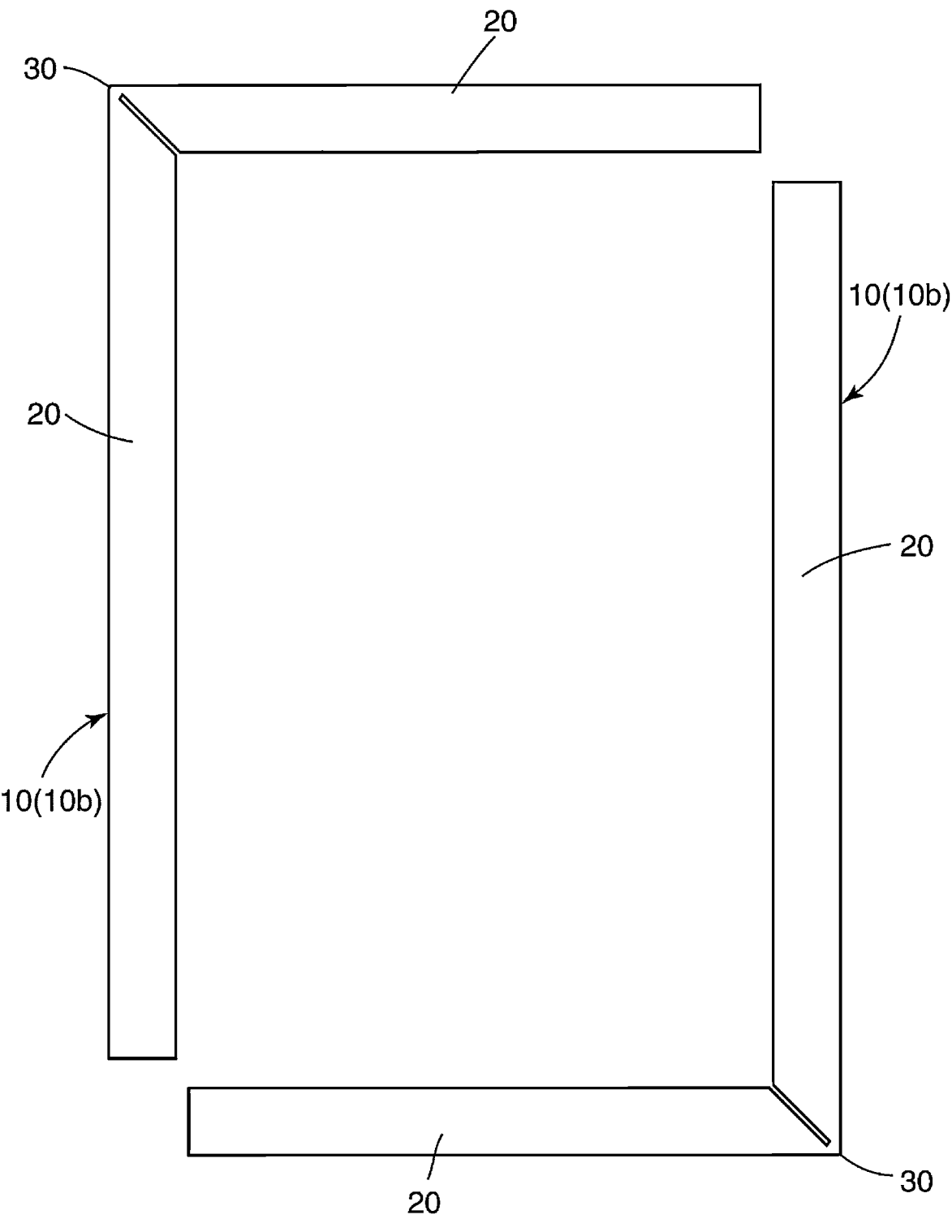
FIG. 12 is a schematic front view of the three-dimensional modeled objects of the third embodiment in an assembled position.
Figure 14:
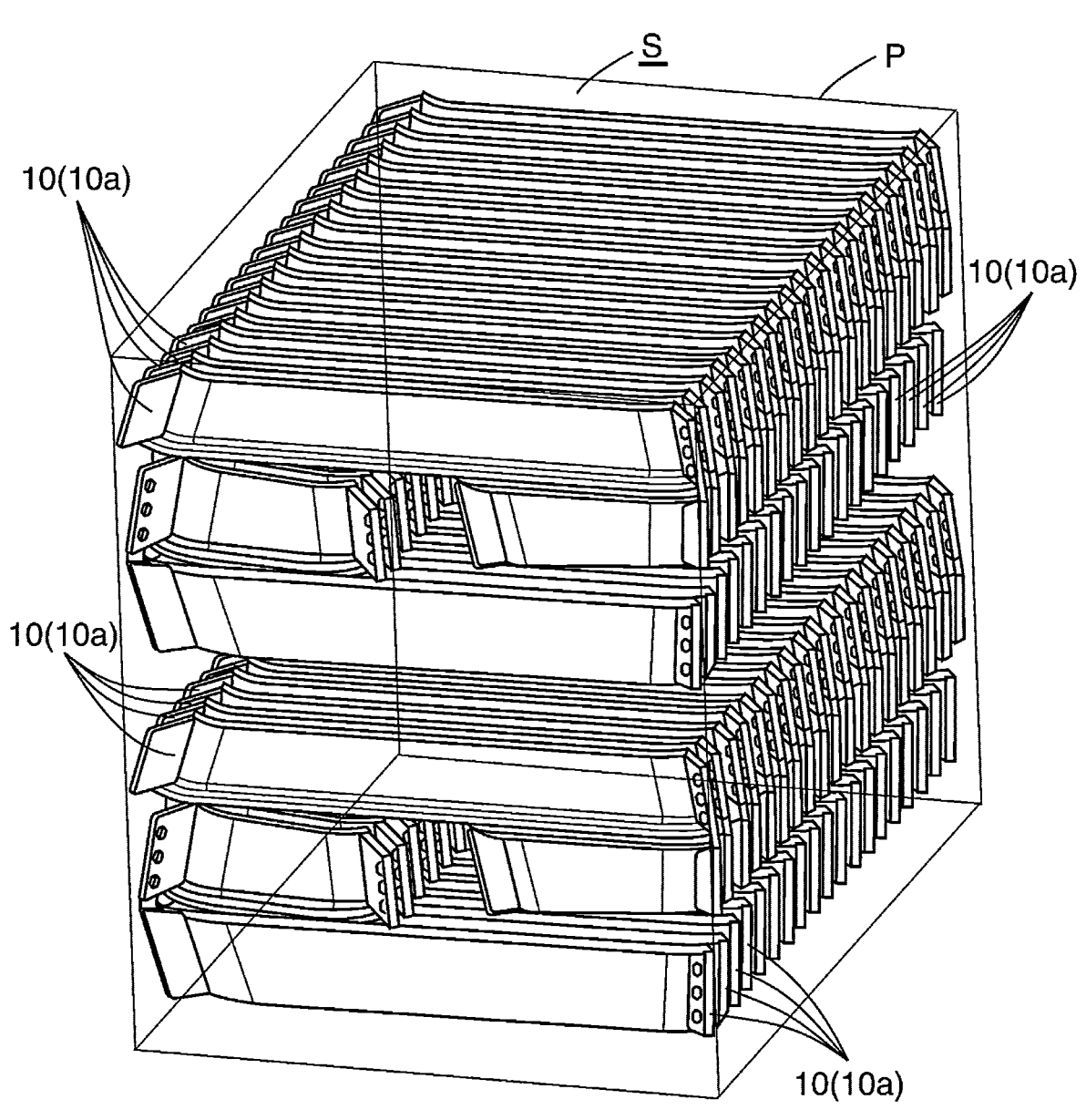
FIG. 14 is a perspective view showing how the three-dimensional modeled objects of the third embodiment are manufactured in one batch in the folded position.

As shown in FIG. 12, each three-dimensional modeled object 10 has a substantial "L" shape in front view when the three-dimensional modeled object 10 is in the assembled position 10*b*. The number of the segments 20 in one three-dimensional modeled object 10 is two. Each segment 20 is shaped into a rod extending substantially linearly. The hinge structure 30 is provided at a corner of the three-dimensional modeled object 10 when the three-dimensional modeled object 10 is in the assembled position 10*b*. As shown in FIGS. 15A and 15B, the hinge structure 30 is an integral hinge integrated with both of the two segments 20 (20*a*, 20*b*) coupled by the hinge structure 30. In the fitting structure 40, the external fitting portion 41 is formed on the first segment 20*a*, and the internal fitting portion 42 is formed on the second segment 20*b*.

Figure 11:
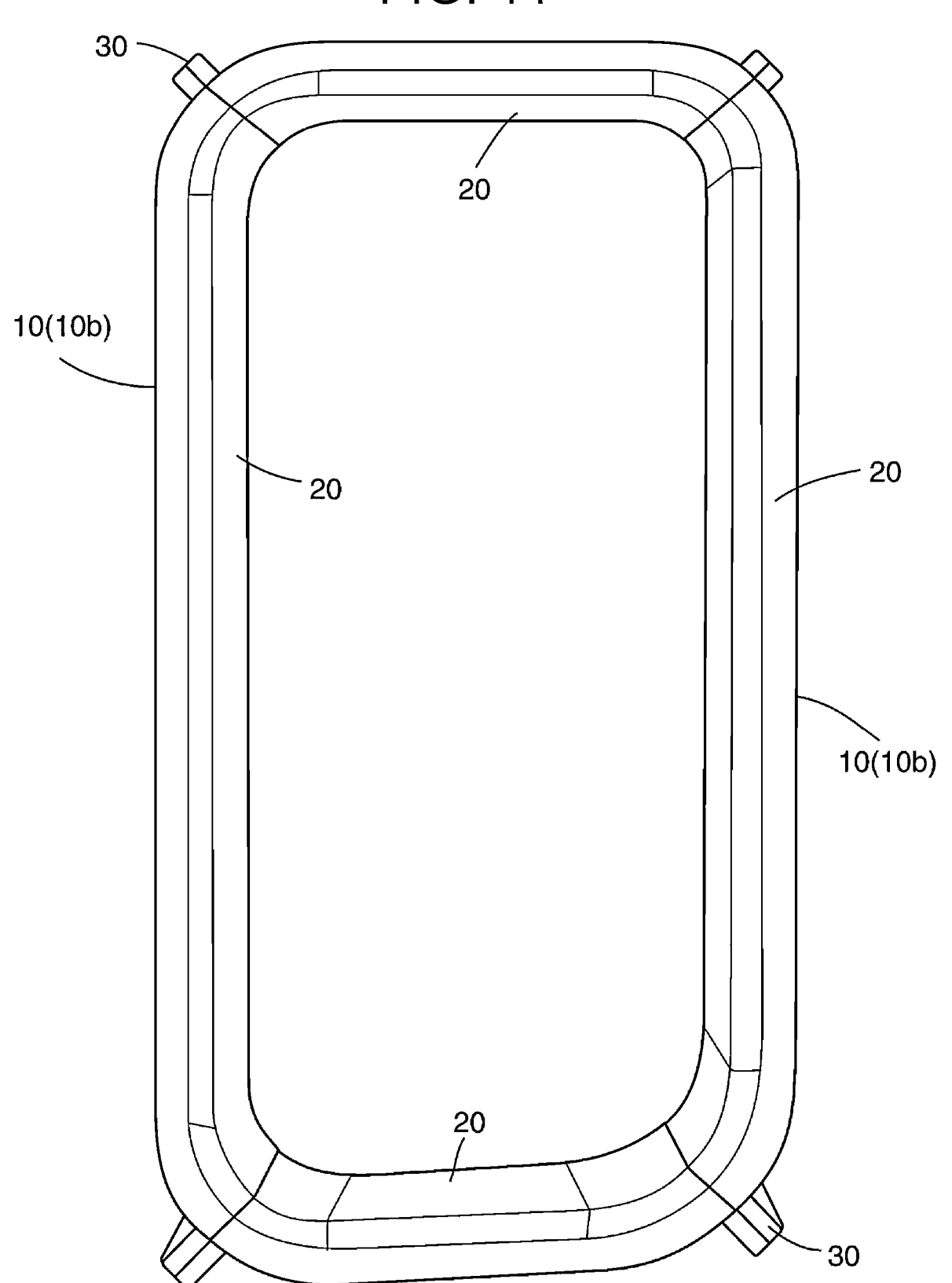
FIG. 11 is a front view showing how three-dimensional modeled objects of a third embodiment are coupled to each other into a product.
Figure 13:
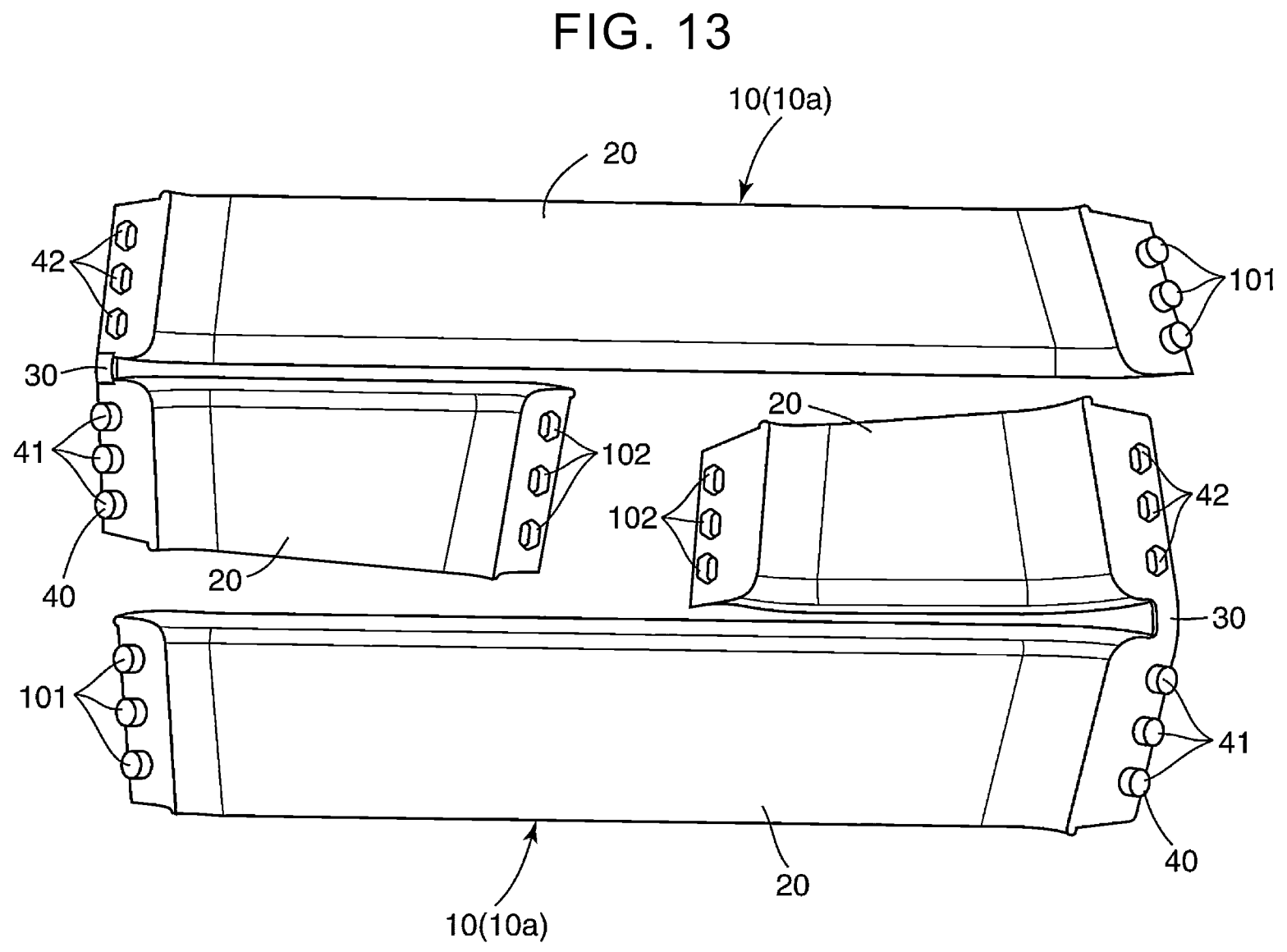

As shown in FIG. 13, the two adjacent three-dimensional modeled objects 10 are coupled (joined) to each other such that fitting protrusions 101 formed on one of the two three-dimensional modeled objects 10 are fitted to fitting receptacles 102 formed on the other of the two three-dimensional modeled objects 10. As a result, a finished product is obtained from the semi-finished three-dimensional modeled objects 10 (FIG. 11). Similarly to the first embodiment, this product has a substantially rectangular frame shape, and is used, for example, for a front duct provided in a vehicle.

In the third embodiment, the method for manufacturing the three-dimensional modeled object 10 is as follows. The semi-finished three-dimensional modeled object 10 is manufactured through the manufacturing step (step (i)) and the assembling step (step (ii)). The method further includes (iii) a coupling step for coupling (joining) two adjacent three-dimensional modeled objects 10 to each other after the assembling step (step (ii)).

In the third embodiment, the following actions and effects can be obtained in addition to the actions and effects obtained from the parts common to the embodiments ((A1) to (A6) and (B1) to (B3)).

(A9) The three-dimensional modeled object 10 is the semi-finished product to be provided as a finished product when two adjacent three-dimensional modeled objects 10 are coupled to each other. Therefore, the components to be manufactured by additive manufacturing can be downsized and the number of components to be manufactured in the one batch S can be increased as compared with a case where the three-dimensional modeled object 10 is a finished product.

(A10) The two adjacent three-dimensional modeled objects 10 are coupled to each other such that the fitting protrusions 101 formed on one of the two three-dimensional modeled objects 10 are fitted to the fitting receptacles 102 formed on the other of the two three-dimensional modeled objects 10 (see FIG. 13). Therefore, the three-dimensional modeled objects 10 can be coupled to each other relatively simply.

(B5) The semi-finished three-dimensional modeled object 10 is manufactured through the manufacturing step and the assembling step. Therefore, the components to be manufactured by additive manufacturing can be downsized and the number of components to be manufactured in the one batch S can be increased as compared with the case where the three-dimensional modeled object 10 is a finished product.

(B6) The method includes the coupling step for coupling two adjacent three-dimensional modeled objects 10 to each other after the assembling step. Therefore, the three-dimensional modeled objects 10 can be coupled to each other.

What is claimed is:

1. A three-dimensional modeled object to be manufactured by additive manufacturing, the three-dimensional modeled object comprising:
   a plurality of segments;
   a hinge structure that couples two adjacent segments among the segments, the two adjacent segments being configured to be bent each other via the hinge structure; and
   a fitting structure including an external fitting portion and an internal fitting portion, the external fitting portion being configured to fit to the internal fitting portion, wherein
   the three-dimensional modeled object is configured to be displaced between a folded position and an assembled position by the hinge structure, the assembled position is a position in which the three-dimensional modeled object is assembled from the folded position,
   the three-dimensional modeled object is held in the assembled position by fitting the external fitting portion to the internal fitting portion when the three-dimensional modeled object is in the assembled position, wherein:
   the three-dimensional modeled object is a product; and
   the three-dimensional modeled object is shaped to have a cavity inside when the three-dimensional modeled object is in the assembled position.

2. The three-dimensional modeled object according to claim 1, wherein the hinge structure includes:
   a first hinge element integrated with one of the two segments coupled by the hinge structure; and
   a second hinge element integrated with the other of the two segments coupled by the hinge structure, the second hinge element being coupled to the first hinge element, the second hinge element being configured to be pivoted to the first hinge element.

3. The three-dimensional modeled object according to claim 2, wherein the external fitting portion is provided on the first hinge element, and the internal fitting portion is provided on the second hinge element.

4. The three-dimensional modeled object according to claim 1, wherein the hinge structure is an integral hinge integrated with both of the two segments coupled by the hinge structure.

5. The three-dimensional modeled object according to claim 4, wherein
   the external fitting portion is provided on one of the two segments coupled by the hinge structure, and
   the internal fitting portion is provided on the other of the two segments coupled by the hinge structure.

6. The three-dimensional modeled object according to claim 1, wherein:
   a first volume of the cavity is smaller than a second volume of the cavity;
   the first volume is a volume of the cavity when the three-dimensional modeled object is in the folded position; and
   the second volume is a volume of the cavity when the three-dimensional modeled object is in the assembled position.

7. The three-dimensional modeled object according to claim 1, wherein the three-dimensional modeled object is a semi-finished product to be provided as a finished product when the three-dimensional modeled object and another three-dimensional modeled object adjacent to each other are coupled to each other.

8. The three-dimensional modeled object according to claim 7, wherein the three-dimensional modeled object and the other three-dimensional modeled object adjacent to each other are coupled to each other by fitting a fitting protrusion provided on one of the three-dimensional modeled object and the other three-dimensional modeled object to a fitting receptacle provided on the other of the three-dimensional modeled object and the other three-dimensional modeled object.

9. A method for manufacturing a three-dimensional modeled object by additive manufacturing, the method comprising:
   a manufacturing step for manufacturing the three-dimensional modeled object by the additive manufacturing in a folded position in which the three-dimensional modeled object in an assembled position is folded by a hinge structure; and
   an assembling step for displacing the three-dimensional modeled object from the folded position to the assembled position, wherein:
   the three-dimensional modeled object is a product;
   the three-dimensional modeled object is shaped to have a cavity inside when the three-dimensional modeled object is in the assembled position.

10. The method according to claim 9, wherein, in the assembling step, an external fitting portion of a fitting structure is fitted to an internal fitting portion by displacing the three-dimensional modeled object from the folded position to the assembled position.

11. The method according to claim 9, wherein:
   in the manufacturing step, the three-dimensional modeled object is manufactured in the folded position;
   the three-dimensional modeled object is folded in the folded position such that a first volume is smaller than a second volume;

the first volume is a volume of the cavity when the three-dimensional modeled object is in the folded position; and the second volume is a volume of the cavity when the three-dimensional modeled object is in the assembled position.

12. The method according to claim 9, wherein the three-dimensional modeled object is a semi-finished product to be provided as a finished product when the three-dimensional modeled object and another three-dimensional modeled object adjacent to each other are coupled to each other, and the three-dimensional modeled object that is the semi-finished product is manufactured through the manufacturing step and the assembling step.

13. The method according to claim 12, further comprising a coupling step for coupling the three-dimensional modeled object and the other three-dimensional modeled object adjacent to each other after the assembling step.

14. A three-dimensional modeled object comprising:

two segments;

a hinge structure that couples the two segments, the two segments being configured to be bent each other via the hinge structure; and a fitting structure including an external fitting portion and an internal fitting portion, the external fitting portion being configured to fit to the internal fitting portion, wherein the three-dimensional modeled object is configured to be displaced between a folded position and an assembled position by the hinge structure, the assembled position is a position in which the three-dimensional modeled object is assembled from the folded position, and the three-dimensional modeled object is held in the assembled position by fitting the external fitting portion to the internal fitting portion, wherein:

the three-dimensional modeled object is a product;

the three-dimensional modeled object is shaped to have a cavity inside when the three-dimensional modeled object is in the assembled position.

* * * * *